United States Patent [19]

Busch, Jr.

[11] 4,343,349
[45] Aug. 10, 1982

[54] HEAT PIPE DEVICE AND HEAT PIPE FABRICATING PROCESS

[76] Inventor: Charles H. Busch, Jr., 1501 Parks Rd., Lake Orion, Mich. 48035

[21] Appl. No.: 192,366

[22] Filed: Sep. 30, 1980

[51] Int. Cl.³ .............................................. F28D 15/00
[52] U.S. Cl. .......................................... 165/1; 165/47; 165/104.21; 134/105; 134/107; 29/157.3 H
[58] Field of Search .................... 165/105, 1, DIG. 12, 165/104.21, 161, 47; 134/105, 107; 122/33

[56] References Cited

U.S. PATENT DOCUMENTS

| | | | |
|---|---|---|---|
| 529,304 | 11/1894 | Perkins | 122/33 X |
| 2,835,480 | 5/1958 | Perez | 165/105 |
| 3,633,665 | 1/1972 | France et al. | 165/105 |

FOREIGN PATENT DOCUMENTS

| | | | |
|---|---|---|---|
| 2501165 | 7/1976 | Fed. Rep. of Germany | 165/DIG.12 |
| 2730489 | 1/1979 | Fed. Rep. of Germany | 134/105 |

*Primary Examiner*—Albert W. Davis
*Attorney, Agent, or Firm*—Cullen, Sloman, Cantor, Grauer, Scott & Rutherford

[57] ABSTRACT

An energy saving liquid to liquid heat exchanger for a dishwasher or like device discharging hot waste water comprising a hot water tank for holding the waste water from the dishwasher and having inlet and outlet pipes, a cold water tank for holding the fresh water going to a water heater and having inlet and outlet pipes, the cold water tank disposed on top of the hot water tank, a bundle of heat pipes containing low boiling refrigerant disposed inside of the two tanks so as to extract heat from the hot water tank and give it up to the cold water tank, whereby the temperature of the fresh water leaving the heat exchanger is higher than its entering temperature.

5 Claims, 3 Drawing Figures

HEAT PIPE DEVICE AND HEAT PIPE FABRICATING PROCESS

My invention relates to energy conservation.

The principal object of my invention is the provision of an energy saving liquid to liquid heat exchanger which materially contributes to the more efficient utilization and conservation of energy sources.

Figure 1:
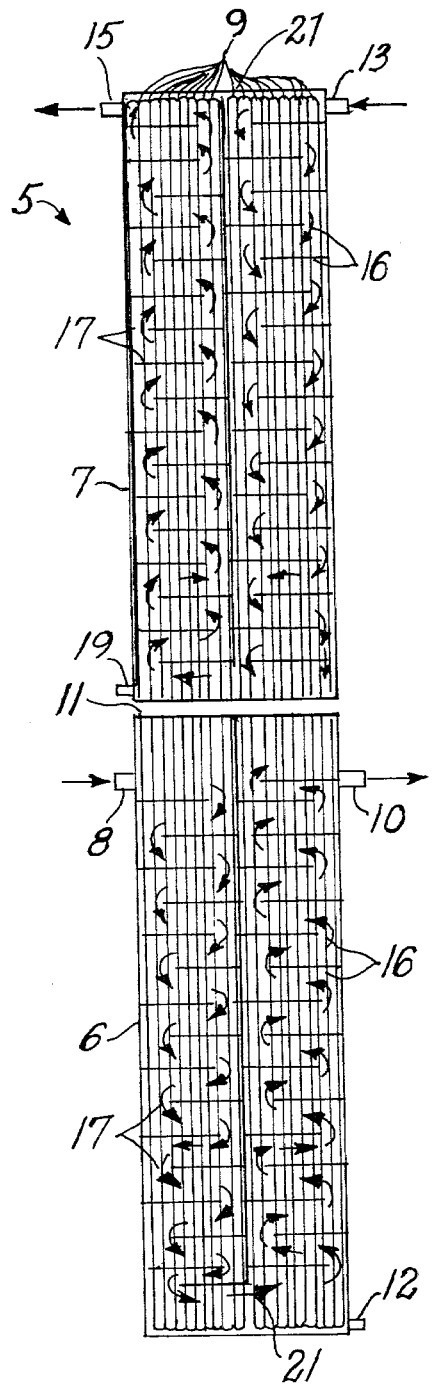
Figure 2:
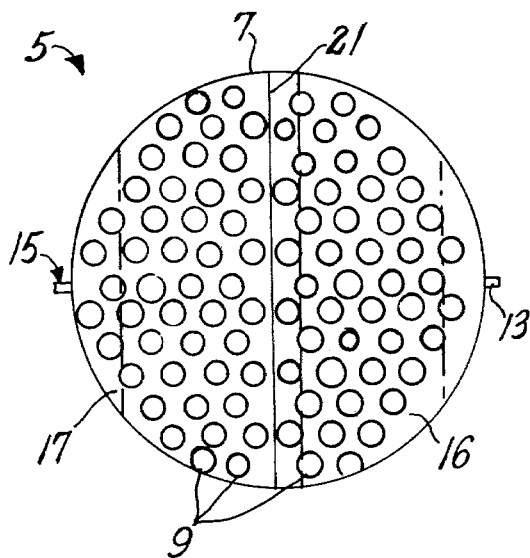

The foregoing object of my invention, together with the advantages thereof, will become apparent during the course of the following description, taken in conjunction with the accompanying drawings, in which:

FIGS. 1 and 2 are, respectively, front elevational and top plan views of an energy saving liquid to liquid heat exchanger embodying my invention; and FIG. 3 is a front elevational view of a heat pipe fabricating mechanism embodying my invention.

Referring to the drawings in greater detail, and first to FIGS. 1 and 2, 5 generally designates said heat exchanger which, in this instance, is a water to water heat exchanger for a dishwasher or like device which discharges hot waste water. Said heat exchanger 5 comprises hot and cold water tanks 6 and 7, respectively, of independent water integrity commonly containing a bundle of spaced apart heat pipes 9 each containing low boiling refrigerant as is well known. Each pipe 9 has ends that are spun closed as will be described. Hot water tank 6 is provided with inlet and outlet pipes 8 and 10, respectively, and a drain pipe 12. Cold water tank 7 is provided with inlet and outlet pipes 13 and 15, respectively, and a drain pipe 19. Conventional water tight seals (not shown) are provided at the top of the hot water tank 6 and at the bottom of cold water tank 7 where the heat pipes 9 pass therethrough. The junction between the two tanks 6 and 7 is preferably insulated at the periphery thereof and closed off as indicated at 11. Each tank is provided with a plurality of oppositely directing horizontal baffles 16 and 17, respectively, and a central vertical baffle 21. Said baffles 16, 17 and 21 cause the liquid flow in each tank to go down one side and up the other and to flow cross-wise of the heat pipes 9 in opposite directions in each half of the tank.

In operation of said heat exchanger 5, fresh water for the dishwasher is piped to inlet pipe 13 and outlet pipe 15 is piped to the inlet of the hot water heater for the dishwasher. The waste water from the dishwasher is piped to inlet pipe 8 and outlet pipe 10 is piped to the sewer. The low boiling liquid refrigerant in the heat pipes 9 continually extracts heat from tank 6 by boiling and gives up heat to tank 7 by condensing. Liquid condensed at the upper end of each heat pipe 9 runs down the inside wall thereof and gases generated at the lower end thereof from boiling rise to the top. This boiling and condensing process takes place continually in the heat pipes 9 during operation of the heat exchanger 5 so that the temperature of the fresh water leaving the heat exchanger 5 (outlet pipe 15) is elevated above its entrance temperature. Temperature indicators or a combination of temperature indicators and flow meters or a direct read-out BTU meter may be employed to monitor the heat exchanger 5 to see that it is functioning properly.

The savings in energy realized from the operation of a dishwasher equipped with my heat exchanger 5 (from the decreased use of heat required to heat the water) will pay for the cost thereof in a short time.

The spun closed seal of each heat pipe materially contributes to the realization of said heat exchanger 5 (since the latter uses so many heat pipes) by decreasing the cost of fabrication of each heat pipe and, at the same time, improving the seal thereof. The means and method by which I spin close an end of each heat pipe 9 is illustrated in FIG. 3 to which reference is now made. Said means comprises a heat pipe filling and sealing machine, generally designated 20, having a base 22 on which are supported suitable ways including a pair of stationary members 24 for moveably guiding a drive mechanism 26 and a filling block generally designated 28. Said filling block 28 consists of a body 29 having a chamber 30 therein and a removeable cover 32 for said body 29 which is sealed thereagainst, as at 33. Pipes 46 and 48 extend, respectively, through opposite side walls of said body 29 and are provided with respective shut-off valves (not shown). The pipe 46 is axially moveable in respect to said body 29 and for this purpose the respective passageway is provided with an O-ring 49 which forms a gas-tight seal around said pipe 46. An empty heat pipe 9 preparatory to being filled and sealed is shown gripped by clamping jaws 34 supported by and disposed in front of said base 22. The jaws 34 hold the heat pipe 9 fast in respect to the base 22.

The heat pipe 9 has a closed bottom end 36 which has been previously spun closed by a conventional pressure operated spinning mandrel (not shown). The upper end 37 of said heat pipe 9 is inserted into said chamber 30 via a passageway in the cover 32 which is provided with O-rings 38 forming a gas-tight seal around said heat pipe 9. During insertion of said heat pipe 9 into said chamber 30, the inner end of said pipe 46 serves as a stop for the upper end 37. A rotary spindle 40 having a holding flange 41 and spinning mandrel 42 affixed to the lower end thereof extends into said chamber 30 through a passageway in the top wall of said body 29 provided with seals 44 forming a gas-tight seal therearound. The mandrel 42 is made of hardened steel and has a cavity 43 formed therein for rotatably bearing against and spinning closed the open end 37 of said heat pipe 9. Said pipe 46 is moveable axially relative to the filling block 28 by well known double-acting means (e.g., a pneumatic cylinder) shown and indicated at 47 in block diagram form. The spindle 40 is rotatably driven by said drive mechanism 26 and both are forcefully moved downwardly on the members 24 by well known means such as hydraulic cylinders and pistons (not shown). The mandrel 42 moves with the spindle 40 as does the filling block 28 (together with pipes 46 and 48) all as a single unit.

In operation of said machine 20, the pipe 48 is connected to a conventional vacuum pump (not shown) while the heat pipe 9 is connected to a suitable source of heat (not shown). The valve for the pipe 48 is opened, the valve for the pipe 46 closed, the vacuum pump started and heat applied to the heat pipe 9. The chamber 30 and empty heat pipe 9 are drawn down to as near a perfect vacuum as possible while the temperature of the heat pipe 9 is raised to about 360° F. to drive out gases entrapped in the wall thereof. Thereafter, heat to the heat pipe 9 is removed (and the same preferably cooled), the valve for the pipe 48 closed, the valve for the pipe 48 closed, the valve for the pipe 46 opened and low boiling liquid refrigerant is poured into the outer end of the fill pipe 46 in order to fill the heat pipe 9 via the open end 37 thereof. The pressure in the heat pipe 9 and the chamber 30 is now that of the partial pressure of the liquid refrigerant at approximately room temperature. A predetermined amount of liquid refrigerant is charged into the heat pipe 9 via the pipe 46 and, as soon as said heat pipe 9 is filled, the means 47 is actuated first in one direction to retract the inner end of the pipe 46 clear of said open end 37. As soon as said inner end of pipe 46 clears said open end 37, the drive 26 is energized (to rotate the spindle 40 and mandrel 42) and forcefully lowered (together with the block 28) to bring the cavity 43 to bear upon said open end 37 to spin it closed and seal it while forcing it to conform to the shape thereof. Upon completion of the filling and sealing of the heat pipe 9, the drive 26 (together with the block 28) is elevated to its initial raised position and the means 47 is actuated in the opposite direction to return the inner end of said pipe 46 to its initial extended position. The sealed heat pipe 9 with the liquid refrigerant captured therein is removed from the block 28 and the process repeated by inserting therein another empty heat pipe with an open end 37 until said open end 37 abuts the inner end of the fill pipe 46 as a stop. Said process not only decreases the cost of fabricating the heat pipe 9 but improves the quality and efficiency of the seal thereof. Thus, the previously described heat exchanger 5 is made possible by making available an abundant supply of heat pipes at low cost but of high quality seals.

It will thus be seen that there has been provided by my invention an energy saving liquid to liquid heat exchanger in which the object hereinabove set forth, together with many thoroughly practical advantages, has been successfully achieved. For example, the independent water integrity of the two tanks 6 and 7 means that there can be no contamination of the fresh water entering the dishwasher if a leak develops in the hot waste water tank. Likewise, my invention provides a heat pipe filling and sealing machine which also materially contributes to the more efficient utilization and conservation of energy sources by making heat pipes with spun closed seals available in quantities and at prices to make it feasible to manufacture said heat exchanger. While a preferred embodiment of my invention has been shown and described, it is to be understood that changes and variations may be resorted to without departing from the spirit of my invention as defined by the appended claims.

What I claim is:

1. An energy saving liquid to liquid heat exchanger for a dishwasher or like device discharging hot waste water comprising a hot water tank for holding waste water from the dishwasher and having inlet and outlet pipes and a top;
  a cold water tank for holding the fresh water going to a water heater and having inlet and outlet pipes and a bottom;
  the cold water tank being mounted upon and in alignment with the hot water tank and secured thereto;
  a central vertical baffle within and along the length of each tank, defining elongated intake and outlet sections connected to said tank inlet and tank outlet pipes respectively;
  a plurality of oppositely directed horizontal baffles arranged upon opposite sides of said vertical baffle with the one baffle on one side extending to the vertical baffle and the adjacent baffle extending to the wall of the tank, the baffles being laterally staggered whereby inwardly flowing water passes through the respective intake sections and successively through the respective outlet sections to the corresponding outlets;
  and a bundle of parallel spaced heat pipes containing low boiling refrigerant, each pipe extending along the length of and between said tanks and through the corresponding baffles therein and sealingly through the top of the hot water tank and the bottom of the cold water tank;
  said tubes at their lower ends extracting heat from the hot water tank vaporizing said refrigerant, the refrigerant vapor rising to the upper ends of said tubes;
  water in the cold water tank successively condensing said vapor, with the heat of condensation being transferred to the water in the cold water tank, whereby the temperature of the fresh water leaving the heat exchanger is higher than its entering temperature;
  said baffles being arranged so that water as it moves through the respective sections of the respective tanks moves laterally therein along the respective staggered baffles substantially at right angles to the respective heat pipes.

2. In the heat exchanger of claim 1, said tank top and tank bottom being spaced apart and insulated.

3. In the heat exchanger of claim 2, an annular band overlying and interconnecting said top and bottom of said tanks.

4. In the heat exchanger of claim 1, the horizontal baffles in the respective tanks being so arranged that water flows crosswise of said heat pipes and in opposite directions in adjacent sections of each tank.

5. An energy saving liquid to liquid heat exchange process for a dishwater or like device discharging hot waste water comprising;
  providing a hot water tank for holding the waste water from the dishwasher or like device and having inlet and outlet pipes;
  providing a cold water tank for holding the fresh water going to a water beater and having inlet and outlet pipes;
  disposing the cold water tank on top of the hot water tank;
  disposing inside of the two tanks a bundle of heat pipes containing low-boiling refrigerant
  providing a vertical baffle in and along the length of each tank defining elongated inlet and outlet sections in each tank;
  positioning and laterally staggering baffles in each tank and within each section and spaced along the length thereof;
  causing the intake water to move in a path at right angles to the heat pipes and longitudinally of the respective inlet and outlet sections with the water in opposing sections in each tank moving in opposite directions;
  evaporating the refrigerant in the heat pipes within the hot water tank extracting heat from the water in the hot water tank;
  and condensing refrigerant in the tubes in the cold water tank, with the heat of condensation being transmitted to the water within the cold water tank, elevating the temperature of the fresh water leaving the heat exchanger above its entering temperature.

* * * * *